United States Patent
Festa et al.

(10) Patent No.: US 10,603,881 B2
(45) Date of Patent: *Mar. 31, 2020

(54) DIGITAL PRINTED DUCT TAPE

(71) Applicant: Shurtape Technologies, LLC, Hickory, NC (US)

(72) Inventors: Daniel Eric Festa, Strongsville, OH (US); Windy Kathal, Denver, NC (US); Ameet Santosh Kulkarni, Hickory, NC (US); David Adam Worley, Hickory, NC (US)

(73) Assignee: Shurtape Technologies, LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,515

(22) Filed: Aug. 8, 2018

(65) Prior Publication Data

US 2019/0039358 A1  Feb. 7, 2019

Related U.S. Application Data

(63) Continuation-in-part of application No. 15/426,726, filed on Feb. 7, 2017, now Pat. No. 10,072,190, which
(Continued)

(51) Int. Cl.
*B32B 3/02* (2006.01)
*B32B 27/20* (2006.01)
(Continued)

(52) U.S. Cl.
CPC .............. *B32B 27/20* (2013.01); *B32B 5/024* (2013.01); *B32B 27/08* (2013.01); *B32B 27/12* (2013.01);
(Continued)

(58) Field of Classification Search
CPC ... B41M 5/0017; B41M 5/0041; B32B 5/024; B32B 27/08; B32B 27/12; B32B 27/308;
(Continued)

(56) References Cited

U.S. PATENT DOCUMENTS

| | | |
|---|---|---|
| 6,348,262 B1 | 2/2002 | Huffman |
| 2006/0159914 A1 | 7/2006 | Beard et al. |

(Continued)

FOREIGN PATENT DOCUMENTS

| | | |
|---|---|---|
| EP | 2 053 104 A1 | 4/2009 |
| JP | 2009 084420 A | 4/2009 |
| SE | 527 031 C2 | 12/2005 |

OTHER PUBLICATIONS

International Search Report and Written Opinion for PCT International Patent Application No. PCT/US2014/047788, dated Oct. 24, 2014, all enclosed pages cited.

(Continued)

*Primary Examiner* — Elizabeth E Mulvaney
(74) *Attorney, Agent, or Firm* — Nelson Mullins Riley & Scarborough LLP

(57) ABSTRACT

An adhesive tape is provided comprising a duct tape having an adhesive surface and a non-adhesive surface, a white ink printed on the non-adhesive surface of the duct tape, and a colored ink printed on top of the printed white ink. The white ink and the colored ink are digitally printed and UV curable. A self-wound roll of adhesive duct tape having digitally printed ink on the non-adhesive surface of the duct tape is also provided.

20 Claims, 7 Drawing Sheets

Related U.S. Application Data is a continuation-in-part of application No. 14/338,513, filed on Jul. 23, 2014, now Pat. No. 9,597,867.

(60) Provisional application No. 61/858,481, filed on Jul. 25, 2013.

(51) Int. Cl.
| | | |
|---|---|---|
| *B32B 27/32* | (2006.01) | |
| *B32B 27/30* | (2006.01) | |
| *B32B 27/08* | (2006.01) | |
| *B32B 27/12* | (2006.01) | |
| *B41M 5/00* | (2006.01) | |
| *C09J 7/24* | (2018.01) | |
| *C09J 7/20* | (2018.01) | |
| *C09D 11/107* | (2014.01) | |
| *B32B 5/02* | (2006.01) | |
| *C09J 7/29* | (2018.01) | |
| *C09D 11/101* | (2014.01) | |
| *C09D 11/322* | (2014.01) | |
| *C09D 11/40* | (2014.01) | |

(52) U.S. Cl.
CPC ............ *B32B 27/308* (2013.01); *B32B 27/32* (2013.01); *B41M 5/0017* (2013.01); *B41M 5/0041* (2013.01); *C09D 11/101* (2013.01); *C09D 11/107* (2013.01); *C09D 11/322* (2013.01); *C09D 11/40* (2013.01); *C09J 7/201* (2018.01); *C09J 7/243* (2018.01); *C09J 7/29* (2018.01); *B32B 2255/26* (2013.01); *B32B 2405/00* (2013.01); *C09J 2205/114* (2013.01); *C09J 2400/26* (2013.01); *C09J 2400/263* (2013.01); *C09J 2423/04* (2013.01); *C09J 2423/041* (2013.01); *C09J 2423/046* (2013.01); *C09J 2433/005* (2013.01); *C09J 2433/006* (2013.01)

(58) Field of Classification Search
CPC .... B32B 27/32; C09J 7/243; C09J 7/29; C09J 7/201; C09D 11/101; C09D 11/107; C09D 11/322; C09D 11/40
See application file for complete search history.

(56) References Cited

U.S. PATENT DOCUMENTS

| | | |
|---|---|---|
| 2007/0188535 A1 | 8/2007 | Elwakil |
| 2008/0233377 A1 | 9/2008 | Smith |
| 2009/0286049 A1 | 11/2009 | McFarland et al. |
| 2010/0039487 A1 | 2/2010 | Sawatsky |
| 2011/0058000 A1 | 3/2011 | Rodin et al. |
| 2012/0111812 A1 | 5/2012 | Bahr |
| 2012/0301660 A1 | 11/2012 | Bartusiak |
| 2013/0050368 A1 | 2/2013 | Lahut et al. |
| 2013/0059105 A1 | 3/2013 | Wright et al. |
| 2013/0101809 A1 | 4/2013 | Kohlweyer et al. |
| 2013/0189503 A1 | 7/2013 | Kozee et al. |
| 2013/0236703 A1 | 9/2013 | Sommers |
| 2014/0329426 A1 | 11/2014 | Peloquin |

OTHER PUBLICATIONS

Chapter I International Preliminary Report on Patentability of corresponding application PCT/US2014/047788, dated Feb. 4, 2016, all enclosed pages cited.

International Search Report and Written Opinion for corresponding International Patent Application No. PCT/US2018/016954, dated Feb. 23, 2018; all enclosed pages cited.

European Extended Search Report for corresponding European Application No. 14829828.4, dated Mar. 17, 2017, all enclosed pages cited.

100

| RELEASE COAT | 110 |
| COLORED INK | 120 |
| WHITE INK | 130 |
| FILM | 140 |
| SCRIM | 150 |
| ADHESIVE | 160 |

| TOP LAYER | 170 |
| CORE LAYER | 180 |
| BOTTOM LAYER | 190 |

FIG. 6B

200

DIGITAL PRINTED DUCT TAPE

CROSS-REFERENCE TO RELATED APPLICATIONS

This application is a continuation-in-part application claiming priority from U.S. patent application Ser. No. 15/426,726, filed on Feb. 7, 2017, which is a continuation-in-part application claiming priority from U.S. patent application Ser. No. 14/338,513, filed Jul. 23, 2014, which claims priority from provisional U.S. Patent Application Ser. No. 61/858,481, filed Jul. 25, 2013, in the United States Patent and Trademark Office. The disclosures of which are incorporated by reference in their entireties.

FIELD OF THE INVENTION

The present invention relates to an adhesive tape, particularly a duct tape, having a digitally printed design thereon and to a method of making a duct tape having a digitally printed design, particularly to a method of making a duct tape having a customized, digitally printed design.

BACKGROUND OF THE INVENTION

There are numerous adhesive tapes in the marketplace. One such tape is duct tape which is known for its high level of adhesive strength. Duct tape typically is relatively thin having a thickness in a range of 5 mils to 12 mils. Duct tape can be torn by hand; however, when unrolled it has a tendency to adhere to itself.

Presently, duct tapes are printed two ways. The first method is reverse printing which allows the duct tape to be self-wound such that no release liner is required. Another option is to use surface printing; however, the print quality is generally very poor and the ink adhesion to the tape is also very poor. Both of these methods also require an investment in print plates and typically require substantial minimum order quantities. The idea behind custom digital printing is to create a tape product that requires no or small minimum order quantities, has very short lead times (on demand printing) and has performance comparable to printed duct tapes that are in the market today. Also, there is no investment in print plates required.

SUMMARY OF THE INVENTION

The present invention relates to a digitally printed duct tape and to methods of making the digitally printed duct tape. The methods of the present invention are particularly suited to printing customized designs and to printing designs in small batches.

Methods of making digitally printed duct tape are discussed herein in accordance with various aspects of the present invention. The methods of the present invention produce a printed duct tape having a UV cured, ink system with the improved efficiencies and cost effectiveness of digital printing. The digital printed duct tape of the present invention may be made with or with or without a release liner. The digital printed duct tape may comprise a material or composition having overcoat properties, release properties, or a combination thereof.

The method(s) of the present invention may be used to make custom digital printed duct tape in the form of die-cuts, rolls, sheets, and banners. The fact that duct tapes and other tapes, such as packaging and paper, have become expressive tools for many crafters solidifies the need for further customization for the end user. It would be impossible to have every desirable design of duct tape. Beyond this, many users desire to personalize their tape experience. They may want a personal photograph or picture on their duct tape or other tape. For example, a company may seek to have its logo or company name on the tape. Other opportunities include special occasions or events such as weddings, birthdays, reunions, anniversaries or graduations.

An advantage of the method(s) of the present invention is the ability to feed or electronically send to a printer a design via an image file with no print plates required, such that the present method(s) is both inexpensive and fast.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 6A is a drawing illustrating a digital printed duct tape of the present invention.

FIG. 6B is an exploded view of the film of the digital printed duct tape of FIG. 6A.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

There are numerous methods of making the digital printed duct tape in accordance with the present invention. Thus, the drawings set forth herein are non-limiting examples of various methods of making customized digitally printed duct tape in accordance with the present invention.

Figure 1:
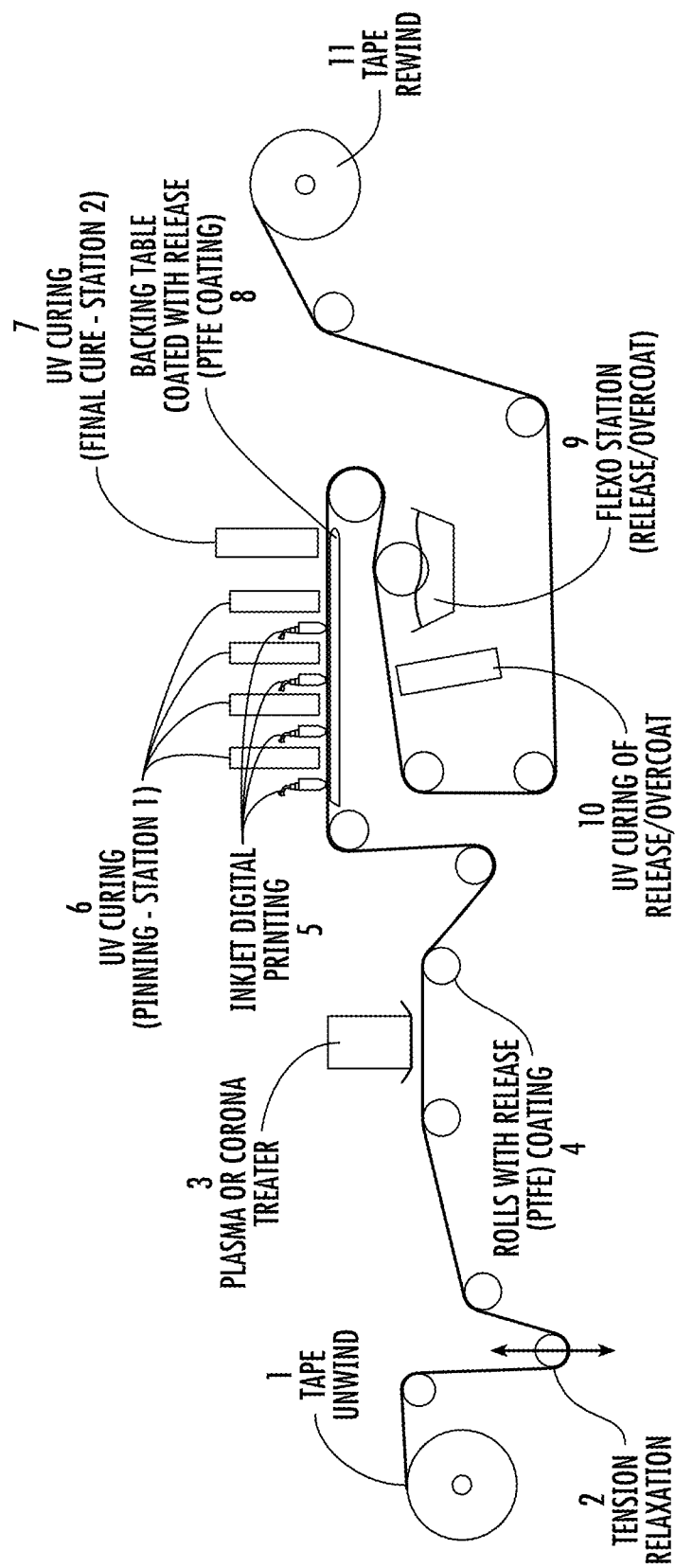
FIG. 1 is a drawing illustrating a method of making the digital printed duct tape of the present invention.

A method of making the digital printed duct tape is shown in FIG. 1. As shown in FIG. 1, a duct tape having an adhesive surface and a non-adhesive surface is provided, and the duct tape is unwound at point 1. Releasing the duct tape from a roll is somewhat tight and may require special web handling to facilitate unwinding. The duct tape travels over a roller(s) with the adhesive surface of the duct tape in contact with the roller(s) until the duct tape reaches point 2. Preferably, the roller(s) in contact with the adhesive surface of the tape are release coated. The duct tape undergoes tension and relaxation at point 2. At point 2, the roller over which the duct tape passes is in contact with the non-adhesive surface of the duct tape. After undergoing tension and relaxation, the adhesive surface of the duct tape passes over other rollers having a release coating, such as polytetrafluoroethylene (PTFE), shown at point 3.

The non-adhesive surface of the duct tape is treated at point 4 in preparation for printing, for example, by passing through a plasma or corona treater. Treatment of the non-adhesive surface of the duct tape may be for a purpose including, but not limited to, preparing the surface for ink adherence and deadening the release so the release coating is not active. The release coating is a low adhesion coating designed to allow the adhesive surface of tape to peel from the surface to which the coating is applied, usually the backside of the tape backing. Deadening the release typically reduces or eliminates the release properties of the low adhesion coating either by removal, oxidation or other chemical or physical change. Plasma or corona treatment nullifies or partially eliminates the functionality (i.e. the release properties) of the release coating and improves surface energy.

A design, which may include a customized design or photograph, is fed or electronically sent via an image file (with no print plates required) to a digital printing station comprising an inkjet printer.

After point 4, the duct tape proceeds to the inkjet digital printing station at point 5. The print design is delivered to the inkjet digital printing station. During inkjet digital printing, printing occurs on the non-adhesive surface of the duct tape. A backing table 8 is coated with a release coating such as PTFE, and the backing table 8 is in contact with the adhesive surface of the duct tape.

After printing, the printed duct tape proceeds to ultraviolet (UV) curing, preferably dual stage UV curing. A first stage of the dual stage UV curing occurs at Station 1, shown at point 6, and a second stage of UV curing occurs at Station 2, shown at point 7. Station 1 is used to pin the ink and allows for higher machine output of up to 250 ft/min. Station 2 is a final UV cure to fully cure the ink.

After UV curing of the printed ink, the duct tape proceeds to a flexography station at point 9 where a material or composition having release and/or overcoat properties is applied to the printed surface of the duct tape. This application may occur in a single operation. It is also contemplated that this application could occur in a multi-stage operation with application of a first material or composition having release properties and with application of a second material or composition having overcoat properties, or vice versa. Among the purposes of an overcoat is to protect the ink. The overcoat prevents, for example, the ink printed design from being scratched off. The overcoat also allows the tape to be self-wound (i.e. wound onto itself) without a release liner. In a preferred aspect of the present invention, the ink is a child-safe (European standard) ink. However, in the case of an overcoat, any ink can be used that is compatible with the overcoat material or composition. The material or composition having overcoat properties is a flexographically applied UV chemistry. Flexographic application uses photopolymer plate(s) to transfer the material or composition to the film. The material or composition having overcoat properties may be a varnish or any material or composition that is compatible with the ink. In an aspect of the present invention, the material or a composition having overcoat properties is UV curable. In another aspect of the invention, the material or composition having overcoat properties comprises an acrylic, urethane-acrylic, silicone-acrylic or other acrylic based chemistry. Use of a material or composition having release properties allows an end user to easily remove the duct tape from the roll.

The printed duct tape proceeds to point 10 where the applied material or composition having release and/or overcoat properties is dried. Drying preferably occurs by curing and the type of drying equipment used is preferably ultraviolet. From point 10, the duct tape proceeds to tape rewind at point 11. The method may further comprise winding the digitally printed duct tape for slitting.

FIG. 1 illustrates unwind and web handling of the duct tape, for example, with the use of coatings to avoid adhesive build-up. It also illustrates a method of making the printed duct tape without use of a release liner.

With the method of the present invention, the line rate of digitally print duct tape is improved and speeds as high as 250 ft/min, for example, may be attained. The equipment for use in the method(s) of the present invention may be capable of slitting inline. The equipment that is used may also be capable of sheeting and die-cutting. An example of suitable equipment is a UV curable custom digital printer that has the ability to deaden the release characteristic of the duct tape (via plasma, corona, chemical/primer or other treatment) and which allows the digital printed duct tape to be digitally printed at speeds as high as 150 to 250 ft/min. These rates are not typical for all digital printing; however, equipment employing dual UV curing technology allows for higher throughputs. Digital printing technology does not require costly print plates which allows for the flexibility to execute very short runs. For example, 20 rolls of a custom design may be used to customize duct tape for use at a special occasion (i.e. party favors). In addition to adding costs, print plates also extend the lead time and, as a result, could lead to logistical problems.

Figure 2:
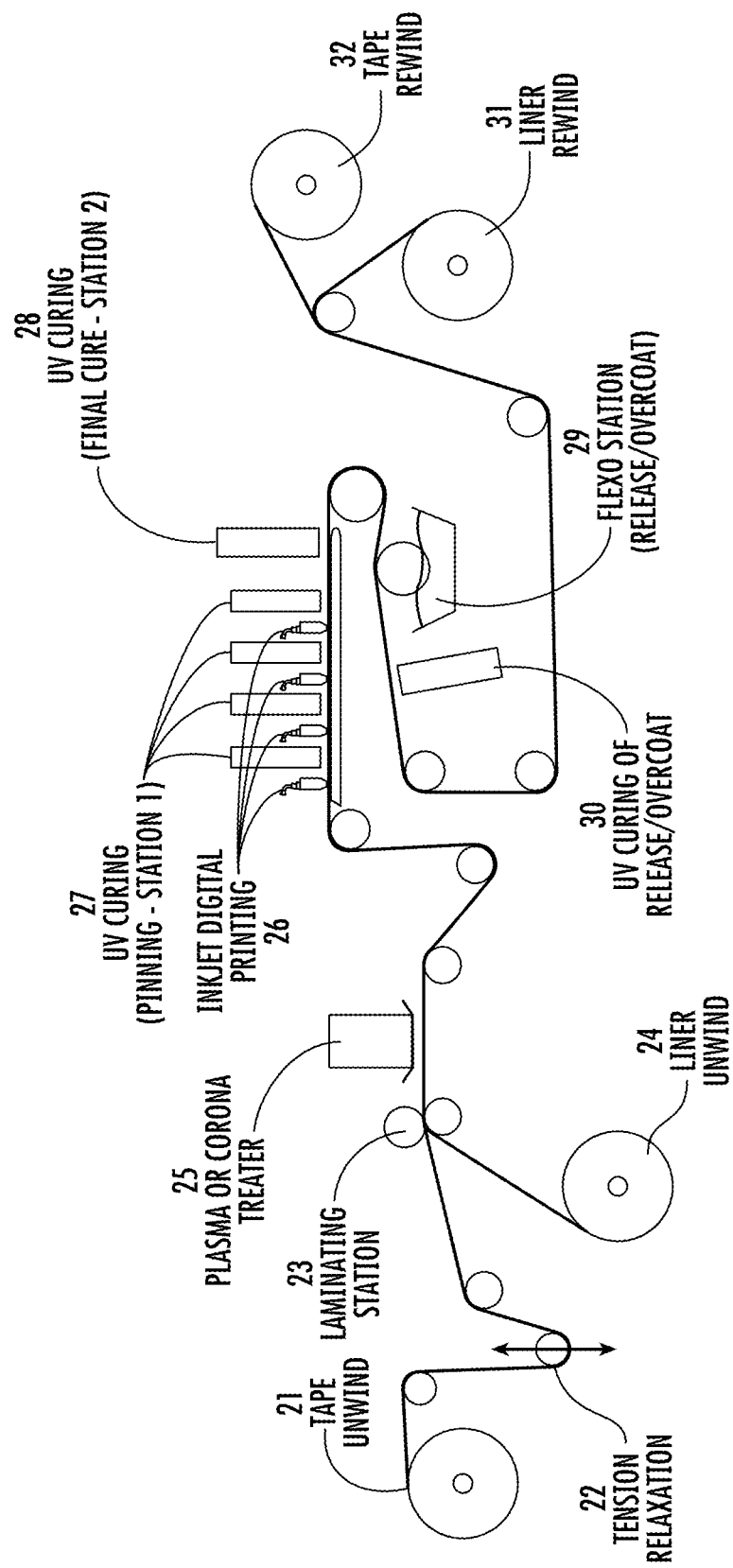
FIG. 2 is a drawing illustrating another method of making the digital printed duct tape of the present invention.

Another method of making the digital printed duct tape in accordance with the present invention is shown in FIG. 2. As shown in FIG. 2, a barrier layer such as a liner is laminated onto the duct tape to ease the web handling through the printing process and the liner is stripped before rewinding the tape. As shown in FIG. 2, a duct tape having an adhesive surface and a non-adhesive surface is provided, and the duct tape is unwound at point 21. Releasing the duct tape from a roll is somewhat tight and may require special web handling to facilitate unwinding. The duct tape travels over a roller(s) with the adhesive surface of the duct tape in contact with the roller(s) until the duct tape reaches point 22. Preferably, the roller(s) in contact with the adhesive surface of the tape are release coated. The duct tape undergoes tension and relaxation at point 22. At point 22, the roller over which the duct tape passes is in contact with the non-adhesive surface of the duct tape. After undergoing tension and relaxation, the adhesive surface of the duct tape passes over other rollers having a release coating, such as polytetrafluoroethylene (PTFE). The duct tape then proceeds to a laminating station at point 23 where a liner is laminated onto the duct tape. The liner unwind occurs at point 24. The non-adhesive surface of the duct tape is treated at point 25 in preparation for printing, for example, by passing through a plasma or corona treater. From point 25, the duct tape proceeds to an inkjet digital printing station at point 26 and then onto ultraviolet (UV) curing. A first stage of the dual stage UV curing occurs at Station 1, shown at point 27, and a second stage of UV curing occurs at Station 2, shown at point 28. Station 1 is used to pin the ink and allows for higher machine output of up to 250 ft/min. Station 2 is a final UV cure to fully cure the ink.

After UV curing of the printed ink, the duct tape proceeds to a flexography station at point 29 where a material or composition having release and/or overcoat properties is applied to the printed surface of the duct tape. This application may occur in a single operation. It is also contemplated that this application could occur in a multi-stage operation with application of a first material or composition having release properties and with application of a second material or composition having overcoat properties, or vice versa. The printed duct tape proceeds to point 30 where the applied material or composition having release and/or overcoat properties is dried. Drying preferably occurs by curing and the type of drying equipment used is preferably ultraviolet. From point 30, the printed duct tape proceeds to liner rewind at point 31 where the liner is removed and to tape rewind at point 32 where, for example, the printed duct tape is wound onto a roll.

Figure 3:
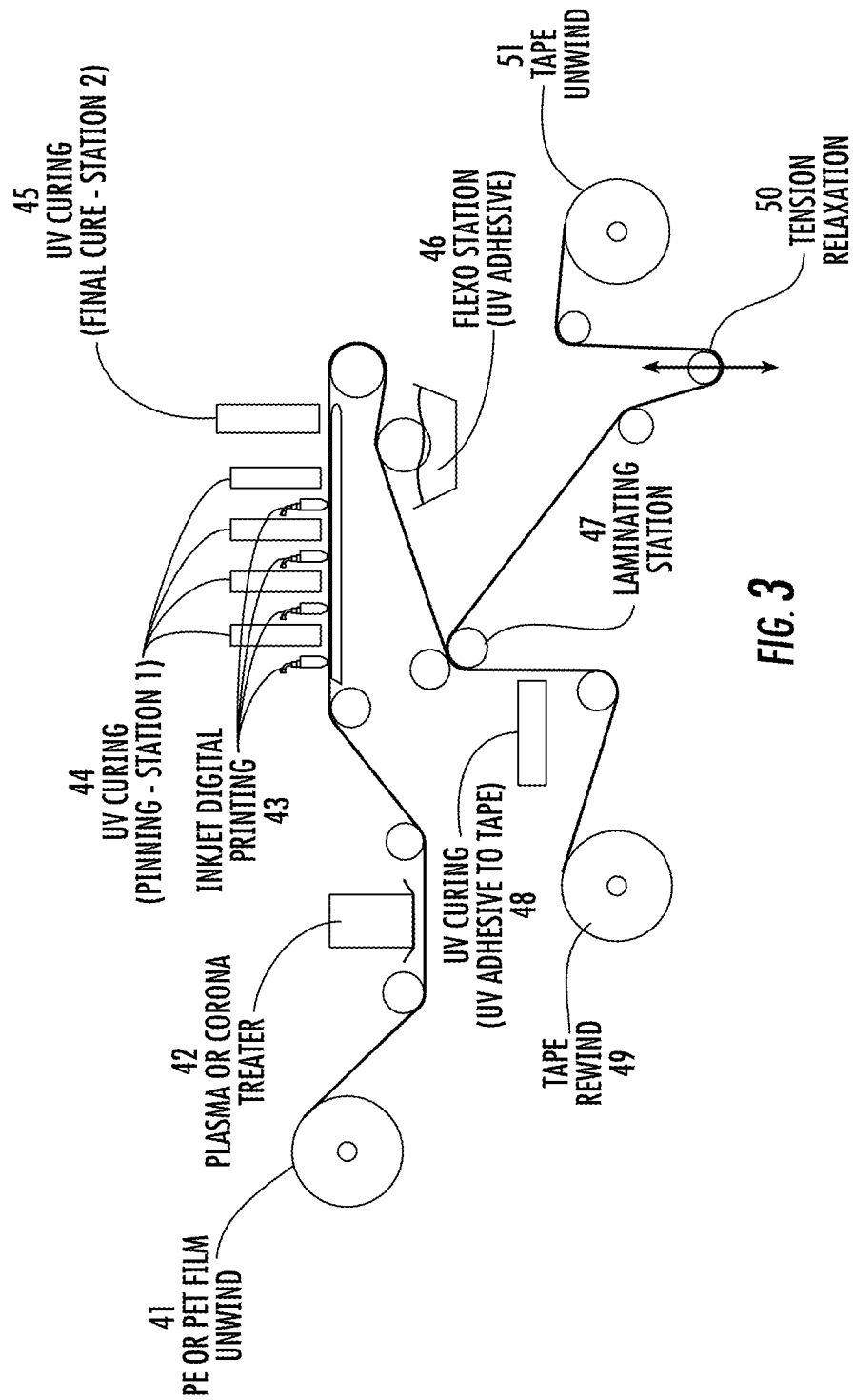
FIG. 3 is a drawing illustrating another method of making the digital printed duct tape of the present invention.

Another method of making digital printed duct tape in accordance with the present invention is shown in FIG. 3. As shown in FIG. 3, printing occurs on a film, preferably a thin film, and then a UV adhesive is applied to a surface of the printed film prior to lamination with a duct tape or subtape component. For example, this method could be used if there are bonding issues using the overcoat material in the other methods. As shown in FIG. 3, a polymeric film such as polyethylene or polyethylene terephthalate goes through unwind at point 41 before undergoing surface treatment by passing through a plasma or corona treater at point 42. After treatment, the film proceeds to an inkjet digital printing station at point 43 and then onto ultraviolet (UV) curing. A first step of UV curing (pinning of the ink at Station 1) occurs at point 44, and a second step of UV curing to dry the ink (final curing at Station 2) occurs at point 45. After UV curing, the printed film proceeds to a flexography station at point 46 where a UV adhesive is applied. A duct tape or a subtape component is unwound from a roll at point 51. The duct tape undergoes tension and relaxation at point 50. The duct tape then proceeds to a laminating station where lamination with the printed film occurs at point 47 to form a laminated tape. UV curing of the UV adhesive of the laminated tape occurs at point 48. Rewind of the laminated tape occurs at point 49.

Figure 4:
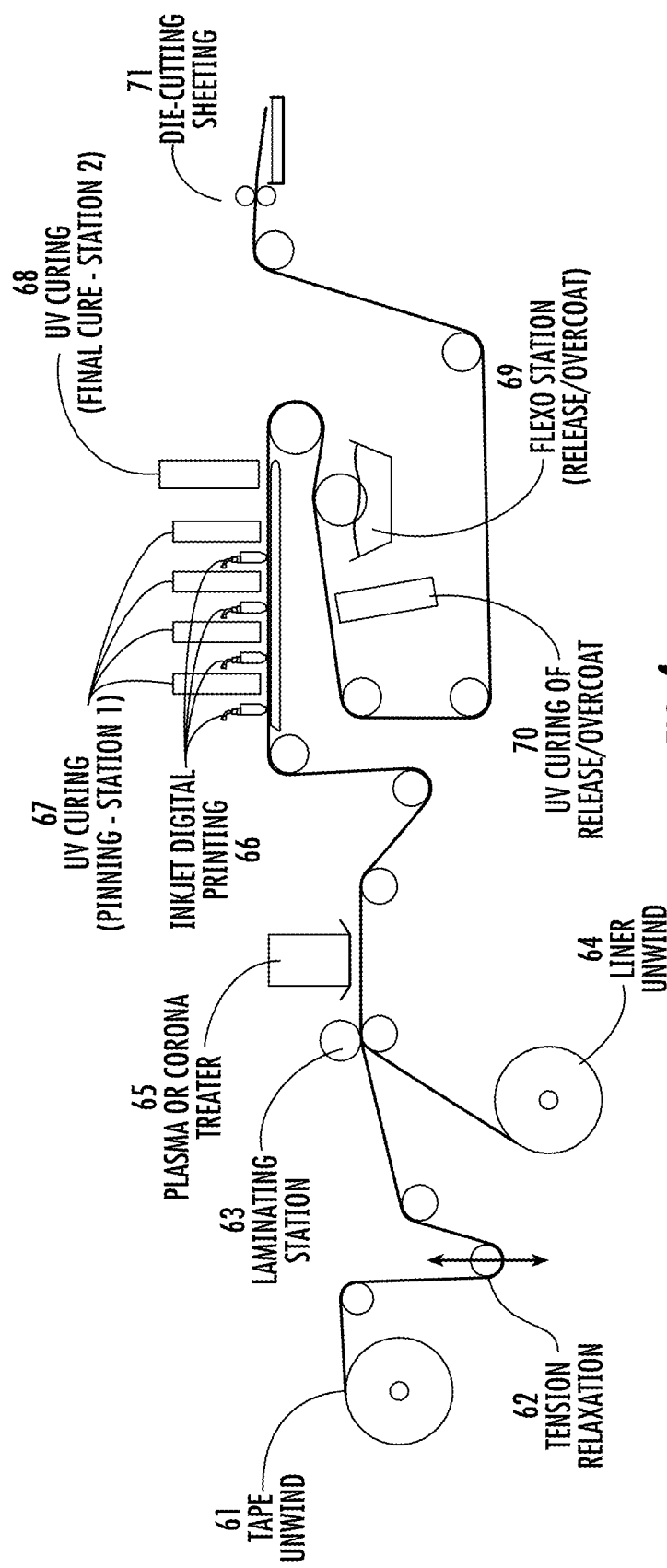
FIG. 4 is a drawing illustrating yet another method of making the digital printed duct tape of the present invention.

Another method of making digital printed duct tape in accordance with the present invention is shown in FIG. 4. The method of FIG. 4 is the same as the method illustrated in FIG. 2 except instead of stripping the liner off, the liner is left on and sheets of the printed tape are cut. Rolls can also be produced on a liner which may be desirable to some end users. As shown in FIG. 4, a duct tape goes through tape unwind at point 61 before undergoing tension and relaxation at point 62. The duct tape then proceeds to a station at point 63 where a liner is laminated or applied to the duct tape. The liner unwind occurs at point 64. The duct tape then passes through a plasma or corona treater at point 65. From point 65, the duct tape proceeds to an inkjet digital printing station at point 66 and then onto ultraviolet (UV) curing. A first step of UV curing (pinning of the ink at Station 1) occurs at point 67, and a second step of UV curing (final curing at Station 2) occurs at point 68. After UV curing, the duct tape proceeds to a flexography station at point 69 where a material or composition having release and/or overcoat properties is applied. The duct tape then proceeds to point 70 where the material or composition having release and/or overcoat properties is cured. From point 70, the duct tape proceeds to die-cutting or sheeting at point 71. The finished product has a release liner.

Figure 5:
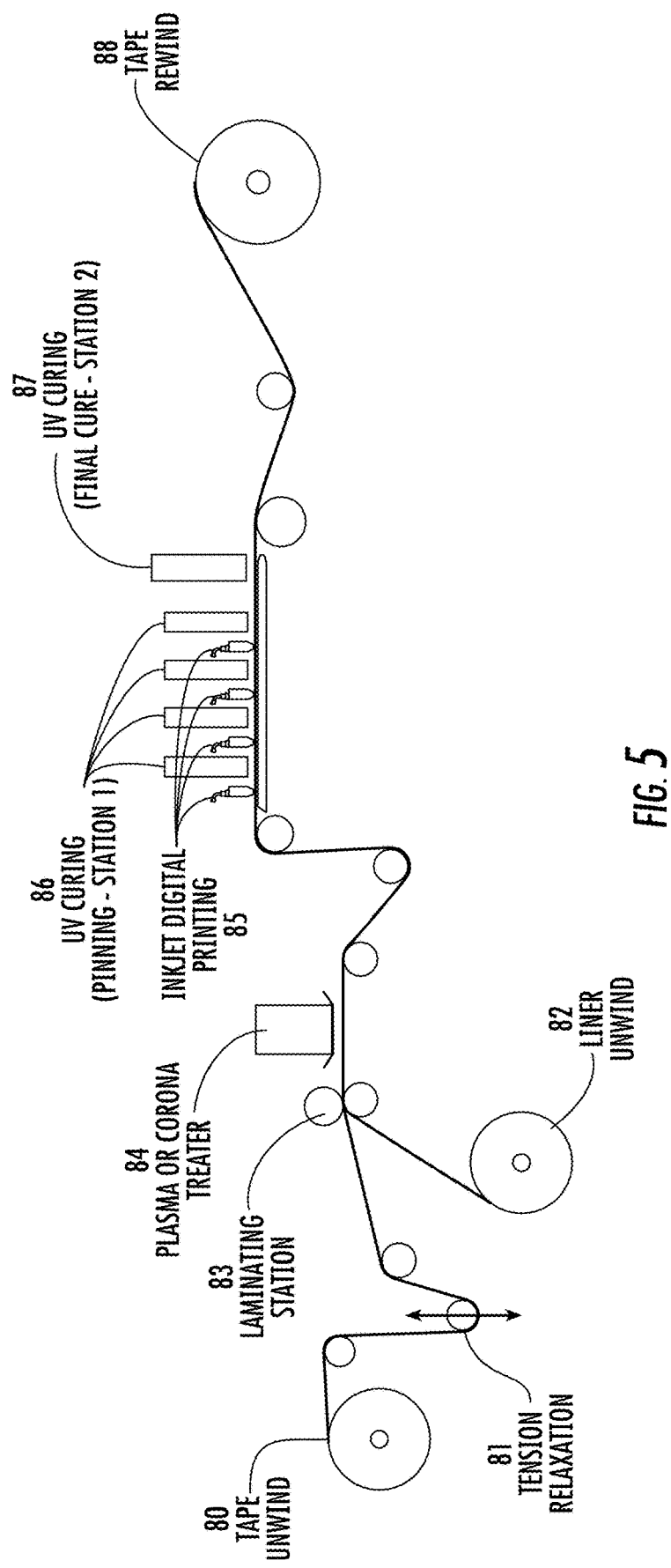
FIG. 5 is a drawing illustrating still yet another method of making the digital printed duct tape of the present invention.

Another method of making the digital printed duct tape in accordance with the present invention is shown in FIG. 5. As shown in FIG. 5, a barrier layer such as a release liner is laminated or applied to the duct tape to ease the web handling through the printing process and so that the liner is present when the printed duct tape is rewound. As shown in FIG. 5, a duct tape having an adhesive surface and a non-adhesive surface is provided, and the duct tape is unwound at point 80. Releasing the duct tape from a roll is somewhat tight and may require special web handling to facilitate unwinding. The duct tape travels over a roller(s) with the adhesive surface of the duct tape in contact with the roller(s) until the duct tape reaches point 81. Preferably, the roller(s) in contact with the adhesive surface of the tape are release coated. The duct tape undergoes tension and relaxation at point 81. At point 81, the roller over which the duct tape passes is in contact with the non-adhesive surface of the duct tape. After undergoing tension and relaxation, the adhesive surface of the duct tape passes over other rollers having a release coating, such as polytetrafluoroethylene (PTFE). The duct tape then proceeds to a station at point 83 where a liner is laminated or applied to the duct tape. The liner unwind occurs at point 82. The non-adhesive surface of the duct tape is treated at point 84 in preparation for printing, for example, by passing through a plasma or corona treater. From point 84, the duct tape proceeds to an inkjet digital printing station at point 85 and then onto ultraviolet (UV) curing. A first stage of the dual stage UV curing occurs at Station 1, shown at point 86, and a second stage of UV curing occurs at Station 2, shown at point 87. Station 1 is used to pin the ink and allows for higher machine output of up to 250 ft/min. Station 2 is a final UV cure to fully cure the ink. After UV curing of the printed ink, the printed duct tape with barrier layer proceeds to tape rewind at point 88. This barrier layer protects the adhesive from adhering to the ink on the tape when rewound.

The method(s) of the present invention is capable of producing finished roll products having features including, but not limited to, custom designs, custom colors, and photography with high resolution. The method(s) of the present invention is also conducive to producing surface printed sheets having features including, but not limited to, custom designs, custom colors, and photography with high resolution. The method(s) of the present invention is also suitable for making die-cut items such as letters, numbers, shapes, and stickers.

The method(s) of the present invention with its digital printing capability provides for duct tape patterns that are not governed by print cylinder repeat. As a result, among the advantages of the method(s) of the present invention are the ability and flexibility to produce low cost proofs and to produce quick-turnaround mockups for customers.

In an embodiment of the invention, an adhesive tape having ink printed thereon is provided. The adhesive tape comprises a duct tape having an adhesive surface and a non-adhesive surface, a white ink printed on the non-adhesive surface of the duct tape, and a colored ink printed on top of the printed white ink.

In an embodiment illustrated in FIG. 6A, an adhesive tape 100 having more than one ink layer is shown, preferably having two ink layers. Below an optional release coat 110, there is a colored ink layer 120. Below colored ink layer 120, there is a white ink layer 130. Below white ink layer 130 is a film 140, a scrim 150, and an adhesive layer 160. The film 140, scrim 150, and adhesive layer 160 are collectively referred to as a duct tape.

Release coating 100 preferably comprises a material selected from the group consisting of acrylic, silicone, poly vinyl octadecyl carbonate (PVODC), fluorinated material, vinyl acetate, or a combination thereof.

Film 140 comprises one or more layers of film. Preferably, film 140 has a thickness in a range of 2 to 4 mils. Preferably, film 140 comprises a polyolefin or blends thereof.

FIG. 6B is an exploded view of film 140 of digital printed duct tape 100 of FIG. 6A. As shown in FIG. 6B, film 140 comprises a top layer 170, a core layer 180, and a bottom layer 190. Top layer 170 of film 140 is preferably comprised of a polymer selected from the group consisting of polyethylene or blends thereof, ethyl methyl acrylate (EMA), and a combination thereof. Core layer 180 of film 140 is preferably comprised of polyethylene or blends thereof. Bottom layer 190 is preferably comprised of a polymer selected from the group consisting of polyethylene or blends thereof, ethyl methyl acrylate (EMA), and a combination thereof. As a non-limiting example, bottom layer 190 may be comprised of a polyethylene blend such as LDPE, LLPDE or a combination thereof.

Non-limiting examples of materials for scrim 150 include, but are not limited to, polyester-cotton, cotton, polyester, polyethylene, polypropylene, and combinations thereof. Preferably, scrim 150 is a cloth scrim.

Non-limiting examples of adhesive 160 include, but are not limited to, natural rubber, synthetic rubber, acrylic, hot melt, polychloroprene, and combinations thereof. Adhesive may be used that gives the tape an unwind measured at 100 fpm (between 1 and 90 oz/in). Adhesive is preferably applied in a coat having a coat weight range of 1 to 7 oz/yd².

In an embodiment of the invention, a duct tape has an adhesive surface and a non-adhesive surface, and a white ink is present in a layer on the non-adhesive surface of the duct tape. Preferably, the white ink is digitally printed on the non-adhesive surface of the duct tape.

The white ink is ultraviolet (UV) light curable. The white ink generally comprises at least one reactive co-monomer, a white pigment, a primary initiator, a polymeric photoinitiator, and an antioxidant. In a preferred embodiment, the white ink comprises titanium dioxide as the white pigment. Preferably, titanium dioxide is present in a range of 5 weight % to 30 weight %. Preferably, the white ink is present in a layer having a thickness up to 25 microns.

In an embodiment of the invention, the white ink comprises dipropyleneglycol diacrylate, 2-(2-vinyloxyethoxy) ethyl acrylate, titanium dioxide, substitute phosphine oxide, oligo[2-hydroxy-2-methyl-1[4-(1-methylvinyl)phenyl]propanone], and butylated hydroxytoluene.

In an embodiment of the invention, the white ink has a composition comprising 30 weight % to 50 weight % of dipropyleneglycol diacrylate, 20 weight % to 40 weight % of 2-(2-vinyloxyethoxy) ethyl acrylate, 5 weight % to 30 weight % titanium dioxide, 1 weight % to 20 weight % substitute phosphine oxide, 0.9 weight % to 5 weight % oligo[2-hydroxy-2-methyl-1[4-(1-methylvinyl)phenyl]propanone], and less than or equal to 1 weight % butylated hydroxytoluene, wherein the weight % is based on the total weight of the composition.

The colored ink is present in a layer on the white ink. Preferably, the colored ink is digitally printed on the colored ink. Preferably, the colored ink has a thickness up to 15 microns.

The colored ink is ultraviolet (UV) light curable. The colored ink generally comprises at least one reactive co-monomer, an optional white pigment, a primary initiator, a polymeric photoinitiator, a colored pigment, and an antioxidant. The optional white pigment is preferably present in a range of 0 weight % to 30 weight %, wherein weight % is based on the total weight of the composition. The colored pigment can be any colored pigment known to one of ordinary skill in the art.

In an embodiment of the invention, the colored ink generally comprises dipropyleneglycol diacrylate, 2-(2-vinyloxyethoxy) ethyl acrylate, substitute phosphine oxide, oligo[2-hydroxy-2-methyl-1[4-(1-methylvinyl)phenyl]propanone], a colored pigment(s), butylated hydroxytoluene, and 2-phenoxyethylacrylate. Non-limiting examples of colored pigments include, but are not limited to, red, green, blue, cyan, magenta, yellow, and key (black). A non-limiting example of a black is carbon black. A non-limiting example of a red is lithol. A non-limiting example of a green is phthalocyanine green. A non-limiting example of a blue is pthalocyanine blue. A non-limiting example of a yellow is an azo compound. A non-limiting example of a magenta is a quinacridone.

In an embodiment of the invention, the colored ink has a composition comprising 50 weight % to 70 weight % dipropyleneglycol diacrylate, 5 weight % to 10 weight % 2-(2-vinyloxyethoxy) ethyl acrylate, 5 weight % to 10 weight % substitute phosphine oxide, 5 weight % to 10 weight % oligo[2-hydroxy-2-methyl-1[4-(1-methylvinyl) phenyl]propanone], 1 weight % to 10 weight % of a colored pigment, less than or equal to 1 weight % butylated hydroxytoluene, and 5 weight % to 10 weight % 2-phenoxyethylacrylate. In an embodiment of the invention, an optional white pigment is also present in a range of 0 weight % to 30 weight %. Weight percentages are based on the total weight of the composition.

In an embodiment, a self-wound roll of adhesive duct tape having digital printing on the non-adhesive surface of the duct tape is provided. Sheets and other forms of the adhesive tape may also be provided.

It has been surprisingly found that use of a white ink printed on a duct tape in combination with a colored ink printed on the white ink has a synergistic effect as it relates to adherence of digitally printed ink on duct tape. There is surprisingly better bonding of a colored ink to duct tape with the use of a white ink as an intermediate layer between the colored ink and the film of the duct tape, resulting in significantly less pick-off or flaking of the colored ink when the adhesive duct tape is self-wound.

Figure 7:
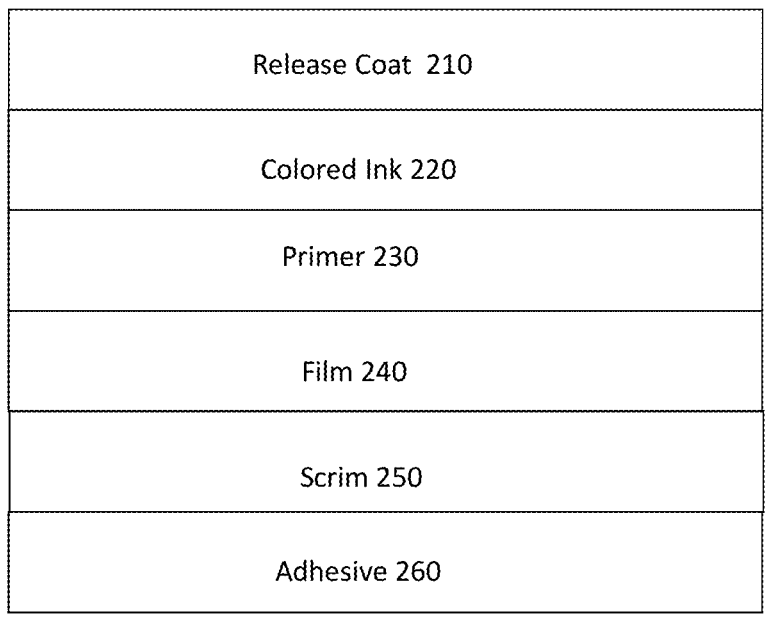
FIG. 7 is a drawing illustrating an embodiment of the digital printed duct tape of the present invention.

In another embodiment of the invention, an adhesive tape is provided comprised of multiple layers. Referring to FIG. 7, an adhesive tape 200 is shown in which there is a single layer of colored ink 220. Colored ink layer 220 is located below an optional release coat layer 210. Below colored ink layer 220 is a primer layer 230 that is used to improve the anchorage between a film 240 and the colored ink layer 220. Below film 240 is a scrim 250. Below the scrim is an adhesive layer 260. The film 240, scrim 250, and adhesive layer 260 are collectively referred to as duct tape.

A purpose of primer layer 230 is to promote adhesion of colored ink layer 220 to film 240. The primer of the primer layer acts an adhesion promoter. Non-limiting examples of primers include, but are not limited to, chlorinated polyolefins, acrylic modified polyolefins, acrylics, polyurethanes, polyethylene amines, titanium dioxide, and a combination thereof. Examples of trade name for commercially available primers are Nazdar 7035 and Colorific Adhesion Promoter 7200.

A white ink may serve as the primer. The primer may comprise, consist essentially of, or consist of a white ink.

Film 240 may comprise one or more layers. Film 240 may be pigmented within any of its layers in a variety of colors. White is a non-limiting example of a color. Film 24 may comprise a top layer, a core layer, and a bottom layer.

The top layer of the film is preferably comprised of a polymer selected from the group consisting of polyethylene or blends thereof, ethyl methyl acrylate (EMA), ethyl vinyl acetate (EVA), ethlyene acrylic acid copolymer, titanium dioxide, calcium carbonate, clay and a combination thereof.

It has been surprisingly found that use of a primer on a duct tape in combination with a colored ink printed on the primer has a synergistic effect as it relates to adherence of digitally printed ink on duct tape. There is surprisingly better bonding of a colored ink to duct tape with the use of a primer as an intermediate layer between the colored ink and the film of the duct tape, resulting in significantly less pick-off or flaking of the colored ink when the adhesive duct tape is self-wound.

Example

25% solids of HP 98, a material having acrylic release chemistry commercially available from Omnova Solutions, Inc., was release coated on a film. The liner was removed and samples slit. One roll was aged in an oven for 16 hours at 150° F. and 60% relative humidity (RH). The rolls were printed in lanes. Each lane was printed in a different combination. One lane had white ink under a blue ink image. Another lane had blue ink and white ink, but did not have the white ink under the blue ink. There were two other lanes that had blue ink but no white ink. All of the rolls tested picked off the ink except for the lane that had a white ink printed first underneath the entire image before the blue ink logo was printed. The white ink appeared to bond better to the film and this was the only lane that was able to make a self-wound roll of tape without pick-off. The blue printed directly on the film had complete pick-off and the roll did not even need to be aged as it happened immediately.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. An adhesive tape comprising:
   a duct tape having an adhesive surface and a non-adhesive surface,
   a primer on the non-adhesive surface of the duct tape, and
   a colored ink printed on top of the primer.

2. The adhesive tape according to claim 1, wherein the duct tape is comprised of a film, a cloth scrim, and an adhesive.

3. The adhesive tape according to claim 1, wherein the colored ink is UV curable.

4. The adhesive tape according to claim 1, further comprising a release coating on the colored printed ink.

5. The adhesive tape according to claim 1, wherein the release coating comprises a material selected from the group consisting of acrylic, silicone, poly vinyl octadecyl carbonate (PVODC), fluorinated-based coating, and vinyl acetate-based coating.

6. The adhesive tape according to claim 1, wherein the colored ink has a thickness up to 15 microns.

7. The adhesive tape according to claim 2, wherein the film is a polyolefin film.

8. The adhesive tape according to claim 2, wherein the film comprises one or more layers.

9. The adhesive tape according to claim 2, wherein the film comprises a top layer, a core layer, and a bottom layer.

10. The adhesive tape according to claim 9, wherein the top layer is comprised of a polymer selected from the group consisting of polyethylene, ethyl methyl acrylate (EMA), ethyl vinyl acetate (EVA), ethlyene acrylic acid copolymer, titanium dioxide, calcium carbonate, clay, and a combination thereof.

11. The adhesive tape according to claim 9, wherein the core layer is comprised of polyethylene.

12. The adhesive tape according to claim 9, wherein the bottom layer is comprised of a polymer selected from the group consisting of polyethylene, ethyl methyl acrylate (EMA), and a combination thereof.

13. The adhesive tape according to claim 12, wherein the bottom layer is comprised of a polyethylene blend comprising LDPE, LLPDE or a combination, thereof.

14. The adhesive tape according to claim 2, wherein the film has a thickness in a range of 2 to 4 mils.

15. The adhesive tape according to claim 1, wherein the colored ink comprises at least one reactive co-monomer, an optional white pigment, a primary initiator, a polymeric photoinitiator, a colored pigment, and an antioxidant.

16. The adhesive tape according to claim 1, wherein the colored ink is digitally printed.

17. The adhesive tape according to claim 1, wherein the colored ink comprises dipropyleneglycol diacrylate, 2-(2-vinyloxyethoxy) ethyl acrylate, substitute phosphine oxide, oligo[2-hydroxy-2-methyl-1[4-(1-methylvinyl)phenyl]propanone], a colored pigment, butylated hydroxytoluene, and 2-phenoxyethylacrylate.

18. The adhesive tape according to claim 1, wherein the colored ink comprises 50 weight % to 70 weight % dipropyleneglycol diacrylate, 5 weight % to 10 weight % 2-(2-vinyloxyethoxy) ethyl, acrylate, 5 weight % to 10 weight % substitute phosphine oxide, 5 weight % to 10 weight % oligo[2-hydroxy-2-methyl-1[4-(1-methylvinyl)phenyl]propanone], 1 weight % to 10 weight % of a colored pigment, less than or equal to 1 weight % butylated hydroxytoluene, and 5 weight % to 10 weight % 2-phenoxyethylacrylate.

19. The adhesive tape according to claim 1, wherein the primer is selected from the group consisting of chlorinated polyolefins, acrylic modified polyolefins, acrylics, polyurethanes, polyethylene amines, titanium dioxide, and a combination thereof.

20. The adhesive tape according to claim 1, wherein the primer comprises a white ink.

* * * * *